(12) United States Patent
Klampfl et al.

(10) Patent No.: US 8,949,028 B1
(45) Date of Patent: Feb. 3, 2015

(54) MULTI-MODAL ROUTE PLANNING

(71) Applicant: Ford Global Technologies, LLC, Dearborn, MI (US)

(72) Inventors: Erica Klampfl, Canton, MI (US); Yimin Liu, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/093,883

(22) Filed: Dec. 2, 2013

(51) Int. Cl.
*G01C 21/34* (2006.01)

(52) U.S. Cl.
CPC .................................. *G01C 21/3423* (2013.01)
USPC .......................................... 701/538; 701/527

(58) Field of Classification Search
CPC ....................................................... G01C 21/36
USPC .................. 701/538, 533, 727, 527
See application file for complete search history.

(56) References Cited

U.S. PATENT DOCUMENTS

| | | | |
|---|---|---|---|
| 7,136,749 B2 | 11/2006 | Ichihara et al. | |
| 8,265,867 B2 | 9/2012 | Arita et al. | |
| 2006/0184314 A1 | 8/2006 | Couckuyt et al. | |
| 2006/0265121 A1 | 11/2006 | Kuo et al. | |
| 2008/0021640 A1 | 1/2008 | Pyo | |
| 2008/0167801 A1 | 7/2008 | Geelen et al. | |
| 2008/0262714 A1 | 10/2008 | Abramovich Ettinger | |
| 2008/0319642 A1 | 12/2008 | DeBie | |
| 2009/0005964 A1 | 1/2009 | Forstall et al. | |
| 2009/0037100 A1 | 2/2009 | Fujiwara et al. | |
| 2009/0105948 A1 | 4/2009 | Chang | |
| 2009/0182498 A1 | 7/2009 | Seymour | |
| 2010/0070163 A1 | 3/2010 | Liu et al. | |
| 2010/0088016 A1 | 4/2010 | Aghara et al. | |
| 2010/0138151 A1 | 6/2010 | Jang et al. | |
| 2010/0145608 A1 | 6/2010 | Kurtti et al. | |
| 2010/0268450 A1 | 10/2010 | Evanitsky | |
| 2010/0287037 A1 | 11/2010 | Rice et al. | |
| 2010/0292921 A1 | 11/2010 | Zachariah et al. | |
| 2011/0022304 A1 | 1/2011 | Lee | |
| 2011/0054786 A1 | 3/2011 | Kim et al. | |
| 2011/0077856 A1 | 3/2011 | Nybom | |
| 2011/0112759 A1 | 5/2011 | Bast et al. | |
| 2011/0137548 A1 | 6/2011 | Shen et al. | |
| 2011/0144903 A1 | 6/2011 | Gupta et al. | |
| 2011/0153191 A1 | 6/2011 | Dhanani | |
| 2011/0172904 A1 | 7/2011 | Dayaratne | |
| 2011/0172908 A1 | 7/2011 | Singh | |
| 2011/0270518 A1 | 11/2011 | Nguyen | |

(Continued)

OTHER PUBLICATIONS www.hopstop.com/about, HopStop.com—About Us, May 31, 2013: What We Do Get door-to-door transit, walking, biking, taxi and hourly car rental directions in over 300 cities worldwide. You can also find places to visit, eat, drink, and sleep in our City Guide.

(Continued)

*Primary Examiner* — Thomas G Black
*Assistant Examiner* — Luke Huynh
(74) *Attorney, Agent, or Firm* — Frank A. MacKenzie; Bejin Bieneman PLC

(57) ABSTRACT

A route start point and a route end point are specified. Data is retrieved relating to a vehicle type for possible use on the route, and including at least one attribute of each of one or more possible route waypoints, the at least one attribute relating to at least parking availability for the vehicle type. A route is determined between the start point and the end point at least in part by applying the route parameter to the attribute.

18 Claims, 3 Drawing Sheets

(56) References Cited

U.S. PATENT DOCUMENTS

| | | | |
|---|---|---|---|
| 2012/0232787 A1 | 9/2012 | Kunath et al. | |
| 2013/0096826 A1 | 4/2013 | Krzanowski et al. | |
| 2013/0096827 A1 | 4/2013 | McCall et al. | |
| 2013/0268187 A1* | 10/2013 | Scofield et al. | 701/400 |
| 2013/0297211 A1* | 11/2013 | Burr et al. | 701/540 |

OTHER PUBLICATIONS https://github.com/openplans/opentripplanner/wiki, OpenTripPlanner Home Page, May 31, 2013: OpenTripPlanner (OTP) is an open source multi-modal trip planner, which runs on Linux, Windows, or potentially any platform with a Java virtual machine.

http://ieeexplore.ieee.org/xpl/login.jsp?tp=&arnumber=1260863&url=http%3A%2F%2Fieeexplore.ieee.org%2Fxpls%2Fabs_all.jsp%3Farnumber%3D1260863, Personalized services for mobile route planning: a demonstration, Mar. 2003: Enabling mobility in urban and populous areas needs innovative tools and novel techniques for individual traffic planning. Represent a prototype of a traffic information system enabling personalized route planning plus advanced services like traffic jam alerting. The best routes are efficiently computed using the SR-Combine algorithm, subject to various user preferences and current traffic situation gathered dynamically from several Internet sources. We implemented a J2EE application server which smoothly adapts to distributed online processing, once high bandwidth networks like UTMS are available.

i11www.iti.uni-karlsruhe.de/extra/publications/p-mmrp-09.pdf, Multi-Modal Route Planning. Thomas Pajor. Mar. 30, 2009: The problem of route planning involving different modes of transportation is called multi-modal route planning. Our goal is very simple. We would like to be able to state source and target addresses (in the road network) together with a departure time, select our desired means of transportation (for example, car, trains and flights, but the car only in the beginning) and the system should return an optimal route with respect to travel time that shows us what roads to use and which trains and flights to take.

Pyrga et al., "Efficient Models for Timetable Information in Public Transportation Systems", ACM Journal of Experimental Algorithmics, vol. 12, Article 2.4, Jun. 2008 (39 pages).

National Center for Transit Research, University of South Florida, "Expanding the Google Transit Feed Specification to Support Operations and Planning", Nov. 2011, Contract No. BDK85 977-15 (65 pages).

Muller-Hannemann et al., "Timetable Information: Models and Algorithms", Feb. 2006 (22 pages).

Geisberger, Dissertation "Advanced Route Planning in Transportation Networks", Feb. 4, 2011 (227 pages).

Bast et al., "Fast Routing in Very Large Public Transportation Networks using Transfer Patterns", Jul. 6, 2010 (16 pages).

* cited by examiner

MULTI-MODAL ROUTE PLANNING

BACKGROUND

Given a specified starting point, and a specified destination, or end point, a variety of possible routes and/or modes of transport may be possible between the starting point and the endpoint. For example, in an urban area, one or more of walking, various modes of public transportation such as buses, light rail, etc., bicycling, using a motor scooter, driving a vehicle such as a car, etc., car sharing or other ride sharing, may be used to travel from a starting point to a destination point. A route that incorporates more than one such mode of transport, e.g., having different segments that are traversed using different respective modes of transport, is sometimes referred to as a multi-modal route.

Various costs may be associated with various portions of a route between a starting point and an end point, e.g., travel time and other travel costs, e.g., fuel costs, pollution emissions, economic costs, parking costs etc. Some or all of these costs may be at least in part dependent upon a mode of transport used for a route portion. Further, where some or all of a route may be traversed using a vehicle, some or all of the costs of a route, or at least one or more portions thereof, may be affected by a type of vehicle. However, mechanisms are currently lacking for taking into account a type of vehicle and other factors in optimizing a route between a specified starting point and a specified destination point.

DRAWINGS

DESCRIPTION

Introduction

Figure 1:
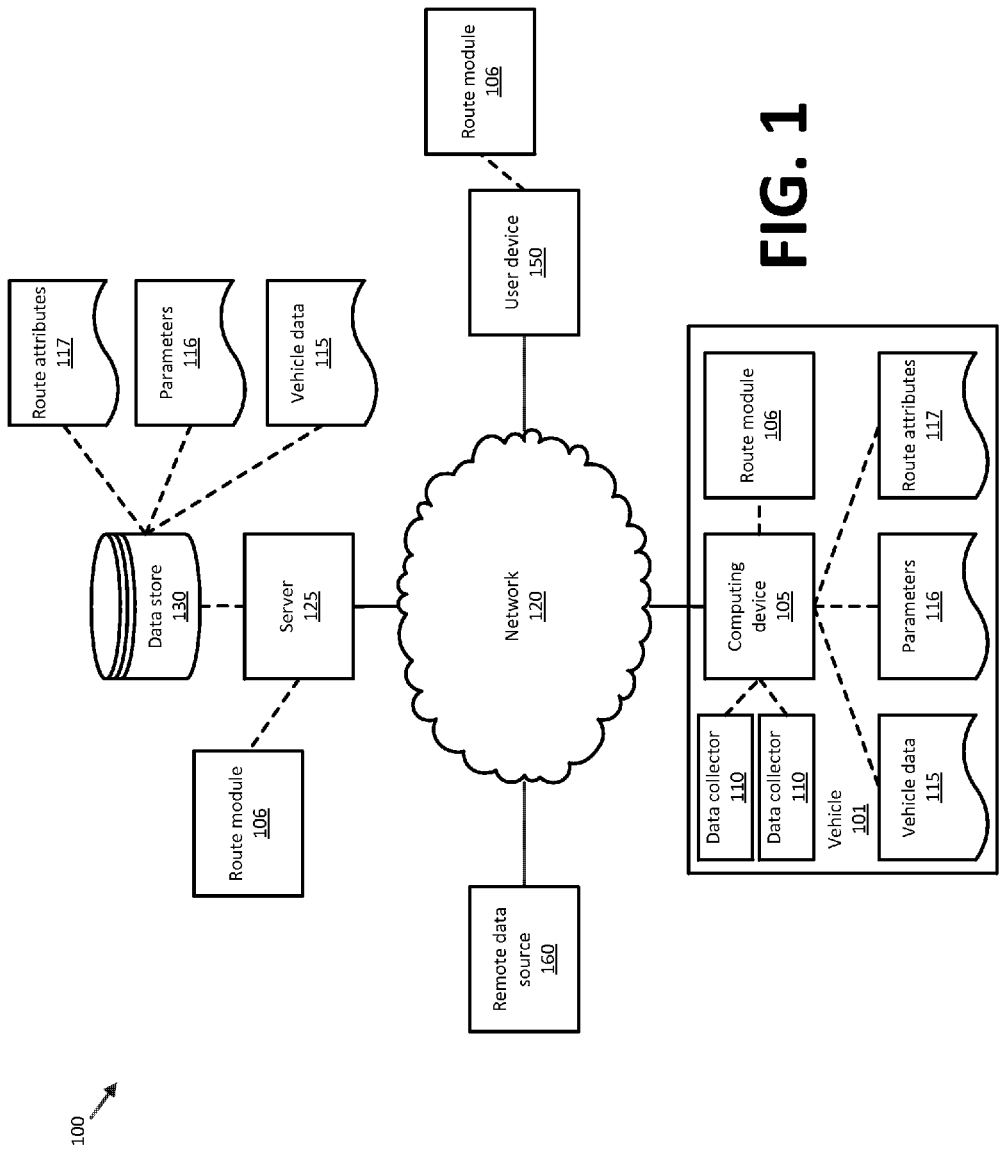
FIG. 1 is a block diagram of an exemplary multi-modal route planning system

FIG. 1 is a block diagram of an exemplary system 100 for planning a multi-modal route. A computing device 105 in a vehicle 101 and/or a user device 150, which may or may not be in a vehicle 101, receives user input and/or provides output to a user, e.g., input concerning specified starting and ending points of a route, and output concerning one or more possible routes between the specified start and end points. Accordingly, the system 100 may include an in-vehicle 101 computing device 105 and/or user device 150, the devices 105, 150, and/or a remote server 125, in turn including computer-executable instructions comprising a route module 106.

The route module 106 may be configured to determine one or more multi-modal routes between the specified start and end points according to parameters 116 that may be specified for a user and/or vehicle 101, etc. Further, generation of a route may take into account conventional factors such as distance, travel time, etc., in addition to factors relating to possible costs of one or more route segments, e.g., emissions, economic costs such as parking costs, etc., that may be stored in the server 125 as route attributes 117, e.g., attributes of waypoints and or segments that may be included on a route. Of further note is that the module 106 may determine factors for consideration in route generation according to an identity or type of a vehicle 101 to be used for at least a portion of the route.

Exemplary System Elements

A vehicle 101, e.g., a motorcycle, motorized bicycle or scooter, an automobile, light truck, medium or heavy-duty truck, an aircraft, a watercraft, etc., includes a vehicle computer 105. The computer 105 may include or be communicatively coupled to more than one computing device, e.g., controllers or the like included in the vehicle 101 for monitoring and/or controlling various vehicle components, e.g., an engine control unit (ECU), transmission control unit (TCU), etc.

The computer 105 is generally configured for communications on a controller area network (CAN) bus or the like. The computer 105 may also have a connection to an onboard diagnostics connector (OBD-II). Via the CAN bus, OBD-II, and/or other wired or wireless mechanisms, the computer 105 may transmit messages to various devices in a vehicle and/or receive messages from the various devices, e.g., controllers, actuators, sensors, etc., including data collectors 110. Alternatively or additionally, in cases where the computer 105 actually comprises multiple devices, the CAN bus or the like may be used for communications between devices represented as the computer 105 in this disclosure.

In addition, the computer 105 may be configured for communicating with the server 125, one or more devices 150, etc., via the network 120, which, as described below, may include various wired and/or wireless networking technologies, e.g., cellular, Bluetooth, wired and/or wireless packet networks, etc. Further, the computer 105, may receive and/or store vehicle data 115, e.g., from one or more data collectors 110 and/or a human machine interface (HMI), such as an interactive voice response (IVR) system, a graphical user interface (GUI) including a touchscreen or the like, etc. The computer may also provide outputs, e.g., to display a route or routes for the vehicle 101, receive user input relating to a route, selecting a route, etc.

Generally included in instructions stored in and executed by the computer 105, a device 150, and/or a remote server 125, is the module 106. Using data received in the computer 105, e.g., from data collectors 110, data included as parameters 116, etc., the module 106 may generate one or more routes and/or potential routes for a user, e.g., multi-modal routes that may include the vehicle 101 and/or other modes of transport.

Data collectors 110 may include a variety of devices. For example, various controllers in a vehicle may operate as data collectors 110 to provide data 115 via the CAN bus, e.g., data 115 relating to vehicle speed, acceleration, state of charge, fuel economy, etc. data identifying a vehicle 101, e.g., a vehicle identification number (VIN) or the like, etc. further, sensors or the like, global positioning system (GPS) equipment, etc., could be included in a vehicle and configured as data collectors 110 to provide data, e.g., weather or temperature, route conditions such as traffic, parking availability, availability of specific lanes, etc., directly to the computer 105, e.g., via a wired or wireless connection.

A memory of the computer 105 generally stores vehicle data 115, which may include a variety of data collected in a vehicle 101 from data collectors 110 and/or stored in a computer 105 memory, e.g., vehicle 101 identifying information such as a VIN. Examples of data 115 are provided above, and moreover, data 115 may include data calculated therefrom in the computer 105. In general, collected data 115 may include any data that may be gathered by a collection device 110 and/or computed from such data. Accordingly, collected data 115 could include a variety of data related to vehicle 101 operations and/or performance, as well as data related to in particular relating to motion of the vehicle 101. For example, collected data 115 could include data concerning a vehicle 101 speed, acceleration, routes traveled, fuel consumption, etc.

A memory of the computer 105 may further store one or more parameters 116. A parameter 116 may include user preferences for route generation and/or selection, e.g., choose fastest, choose most economical, weights to be given to factors such as fuel costs, time of travel, weather conditions, etc., in route generation and/or selection, etc. Another example of parameters 116 include weight to be given to availability of parking for a vehicle 101 and/or a weight to be given to a cost for parking a vehicle 101, a weight to charging station, a weight to the availability of special lanes for a vehicle (e.g., based on a vehicle type, e.g., hybrid-electric, battery-electric, a number of passengers in the vehicle 101, etc.)

Further, data 115 and/or parameters 116 could include data collected from a user device 150, a remote source 160, or some other mechanism. For example, parameters 116 could be determined from data gathered from an HMI of the computer 105 and/or a user device 150 concerning user preferences, e.g., concerning preferred points of interest, route preferences, etc. or category of user. Further, data 115 could include data from biometric sensor data collectors 110, e.g., indicating a vehicle 101 operator's likely age, gender, a number of vehicle 101 occupants, etc.

An example of data 115 from a remote source 160 includes data 115 in General Transit Feed Specification (GTFS) format, such as may be obtained from various sources 160, e.g., via the Internet, specifying schedules and other attributes of one or more public transit systems relevant to a geographic area of a planned route. In another example, data 115 could include historical and/or real-time (or near real-time) traffic data that is collected and stored in the server 125, e.g., from remote sites 160, and provided to the vehicle 101 computer 105. Using such data 115, the computer 105 could, e.g., where it was determined that the vehicle 101 was approaching a high traffic area at a time when traffic delays were possible, or likely, recommend that a vehicle 101 refuel, visit a refueling waypoint, etc. Likewise, information relating to road construction could be provided, e.g., road closures, lane closure, bridge work, etc., that may cause traffic delays, detours, etc.

Parameters 116 may provide constraints, values, etc. for the module 106 to determine a route for a user. The parameters 116 may be stored in the data store 130 and/or in a memory of or connected to a computing device 105. Further, parameters 116 may be provided to a user device 150, e.g., from the data store 130 via the server 125, even if not persistently stored in a memory of the user device 150. In any event, parameters 116 may be stored, for example, for a particular vehicle 101, a type of vehicle 101, for a particular user, for a category of users (e.g., users in a particular geographic area, users of a particular age, etc.). An example of parameters 116 include weights to be given to various attributes 117, as discussed further below, e.g., whether particular kinds of waypoints are preferred or disfavored in a route, whether particular modes of transportation are preferred or disfavored, etc. Further examples of parameters 116 include rules governing whether a particular kind of waypoint, e.g., light rail station, bus station, etc., may be used in a route.

Attributes 117 may be used to describe route waypoints and segments. As discussed further below with respect to FIG. 2, waypoints may be represented as "nodes" and segments may be represented as "arcs" in a graph representing a route. Exemplary waypoints include transit stations (e.g., bus, light rail, etc.) refueling stations, restaurants, etc. Route segments include road segments, light rail and/or bus segments (e.g., from one bus stop to another, from one rail stop to another, from a bus stop to a rail stop, etc.), pedestrian segments, etc. Attributes 117, accordingly, may describe a type of segments, e.g., a waypoint attribute 117 may include the description "light rail station." Likewise, a segment attribute 117 may include the description "bus travel." Further, attributes 117 may provide further details concerning route elements. For example, a waypoint attributes 117 may include information concerning available parking at a waypoint, costs of parking, types or classes of vehicles (e.g., BEV, HEV, etc.) for which parking is available and respective costs, etc. As with parameters 116, attributes 117 may be provided to a user device 150, e.g., from the data store 130 via the server 125, even if not persistently stored in a memory of the user device 150.

The network 120 depicted in FIG. 1 represents one or more mechanisms by which a vehicle computer 105 may communicate with a remote server 125 and/or a user device 150. Accordingly, the network 120 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The server 125 may be one or more computer servers, each generally including at least one processor and at least one memory, the memory storing instructions executable by the processor, including instructions for carrying out various steps and processes described herein. The server 125 may include or be communicatively coupled to a data store 130 for storing data 115 and/or parameters 116 and/or attributes 117, e.g., that might be obtained from one or more remote sites 160 or some other source, uploaded from one or more vehicle 101 computers 105 etc. Further, parameters 116 could be stored for a particular user and/or category of user, e.g., based on age, level of driving experience, past driving behaviors, route choices etc. For example, one or more parameters 116 for a particular user or category of user could be stored in the server 125 and retrieved by the computer 105 when a user requested a route to be generated, e.g., from a computer 105 or 150.

A user device 150 may be any one of a variety of computing devices including a processor and a memory, as well as communication capabilities. For example, the user device 150 may be a portable computer, tablet computer, a smart phone, etc., that includes capabilities for wireless communications using IEEE 802.11, Bluetooth, and/or cellular communications protocols. Further, the user device 150 may use such communication capabilities to communicate via the network 120 including with a vehicle computer 105. A user device 150 could communicate with a vehicle 101 computer 105 the other mechanisms, such as a network in the vehicle 101, known protocols such as Bluetooth, etc. Accordingly, a user device 150 may be used to carry out certain operations herein ascribed to a data collector 110, e.g., voice recognition functions, cameras, global positioning system (GPS) functions, etc., in a user device 150 could be used to provide data 115 to the computer 105. Further, a user device 150 could be used to provide a human machine interface (HMI) to the computer 105.

One or more remote sites 160 may be accessible to the server 125 and or a computer 105 via the network 120, e.g., the Internet. For example, as mentioned above, a remote site 160 could provide information concerning traffic conditions, weather conditions, transit information, etc. Further, a remote site 160 could be a social network or the like, providing data 115 relating to a user's preferred brands of restaurant, fuel, etc., preferred routes, and other personal attributes. Yet further, a remote site may provide data 115, e.g., for use in determining parameters 116, or that may be compared to parameters 116. For example, as mentioned above, collected data 115 from a remote site 160 could indicate one or more re-fueling stations in a geographic area, information relating to available parking in a geographic area, etc. Such collected data 115 could be compared to a user parameter 116 specifying, for example, a weight to be given to availability and/or costs of parking.

Routes

Figure 2:
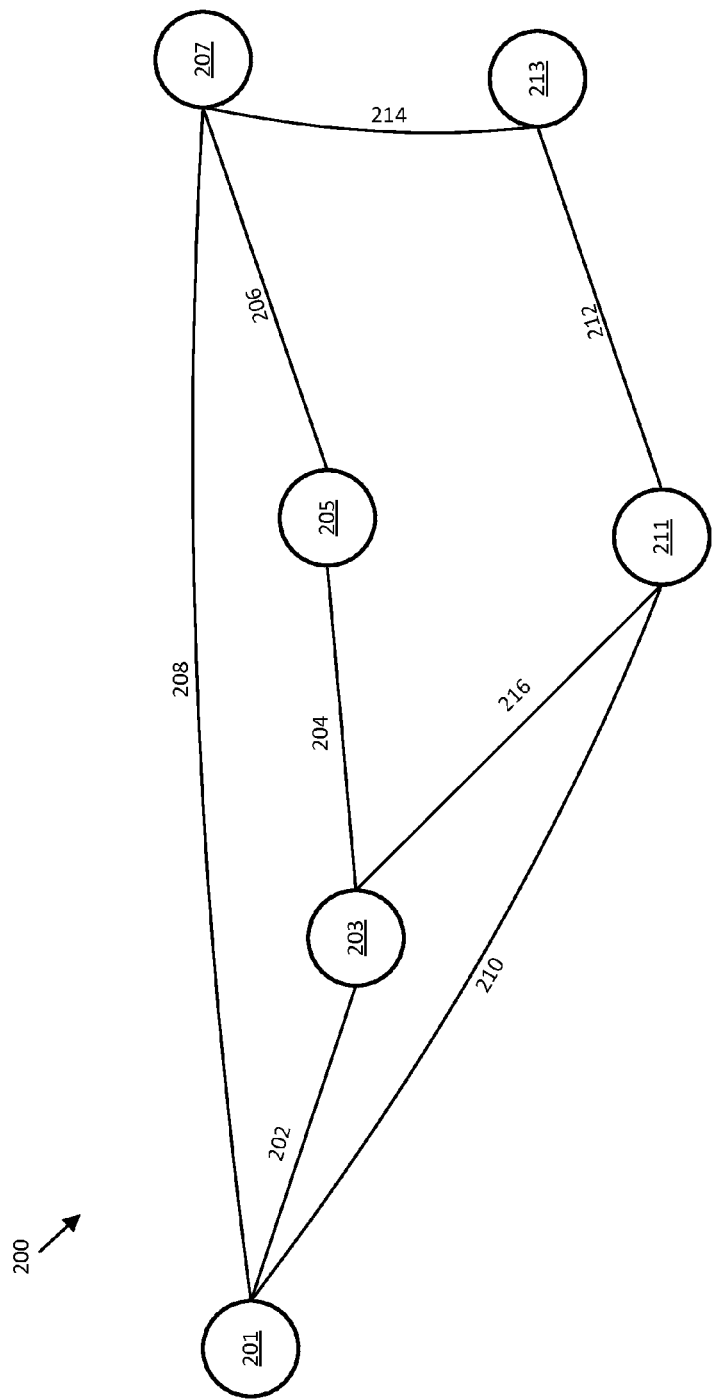
FIG. 2 is a diagram of an exemplary graph used to illustrate route selection.

FIG. 2 is a diagram of an exemplary graph 200 used to illustrate route selection. Nodes 201, 203, 205, 207, 211, and 213 of the graph 200 include possible start points, and points, and/or waypoints of a route. Arcs 202, 204, 206, 208, 210, 212, 214, and 216 represent possible route segments. For example, a route could begin at a node 201, and end at a node 207. Various possible routes between the nodes 201, 207 may be determined, e.g., a first route could follow the arc 208, only second route could follow the arcs 202, 216, 212, and 214.

Each of the arcs 202, 204, 206, 208, 210, 212, 214, and 216, may represent a particular mode of transport, and may be included in various routes between a user's specified start and end points. For example, assume that the node 201 represents a user's specified starting point for a route, and the node 207 represents a specified endpoint. The arc 208 could represent surface road travel, e.g., driving in a vehicle 101, from the starting point node 201 to the ending point of node 207.

Further for example, the arcs 202 could represent a pedestrian mode from the node 201 to a light rail station, e.g., a subway or elevated train station, represented by the node 203. The arc 204 could represent light rail travel from a first light rail station (note 203) to a second light rail station (node 205). Moreover, the arc 206 could represent a bus mode of transport from the second light rail station (node 205) to the route ending point (node 207).

Yet further for example, the arc 210 could represent surface road travel from the route starting point (node 201) to a light rail station (node 211). The arc 212 could represent light rail travel on a first train line from a first station (node 211) to a second station (node 213) the arc 214 could represent light rail travel on a second train line from the second station (node 213) to a third light rail station at the route ending point (node 207).

Information stored in a computer 105, 125, and/or 150, as described above, may include locations and other attributes 117 of possible route waypoints in a geographic area that may be represented by nodes 201, 203, etc. For example, attributes 117 may include waypoint locations that may be specified using geo-coordinates such as are known. Further, attributes 117 of route waypoints may include availability of parking, refueling, etc. With respect to such attributes 117, information may include details relevant to determining whether to include a waypoint in a route, e.g., according to one or more parameters 116 as described above. For example, where a waypoint attribute 117 includes availability of parking, relevant available details may include a type or types of vehicles for which parking is available (e.g., bicycles, motorcycles, battery electric vehicles (BEV), hybrid electric vehicles (HEV), all vehicles, etc.), a cost for parking, including different parking costs for different vehicles or vehicle types if applicable, etc.

Accordingly, nodes 201, 203, etc., may be selected for a route based on attribute 117 information associated with the node 201, 203, etc. For example, the module 106 could determine that a route having a shortest travel time between a starting node 201 and an end node 207 included an arc 210 requiring driving a vehicle 101 such as a car from a node 201 to a node 211, parking the car at a light rail station represented by the node 211, and proceeding to the destination node 207 via a light rail arcs 212, 214. However, waypoint attribute 117 information could specify that parking at the light rail station represented by the node 211 was not available for cars other than BEV cars. Thus, if data 115 indicated that a vehicle 101 potentially being used on the route between the nodes 201, 207 was a car having only an internal combustion (IC) engine, the route including the node 211 would not be presented.

Additionally or alternatively, waypoint attribute information could specify that parking at the light rail station for a particular vehicle 101 type was above a cost threshold indicated by a parameter 116, where the module 106 included instructions to disregard any potential route having an economic cost of parking above the cost threshold. Yet further additionally or alternatively, the module 106 could include instructions, e.g., according to weights specified by one or more parameters 116, to select a route having a longer travel time but lower economic costs, e.g., rail stations at different nodes 203, 211 could each include parking lots, but a node 203 could be selected for a route over the node 211 where parking at the node 203 would be cheaper, e.g., for a specified vehicle type, then parking at the node 211.

Process Flow

Figure 3:
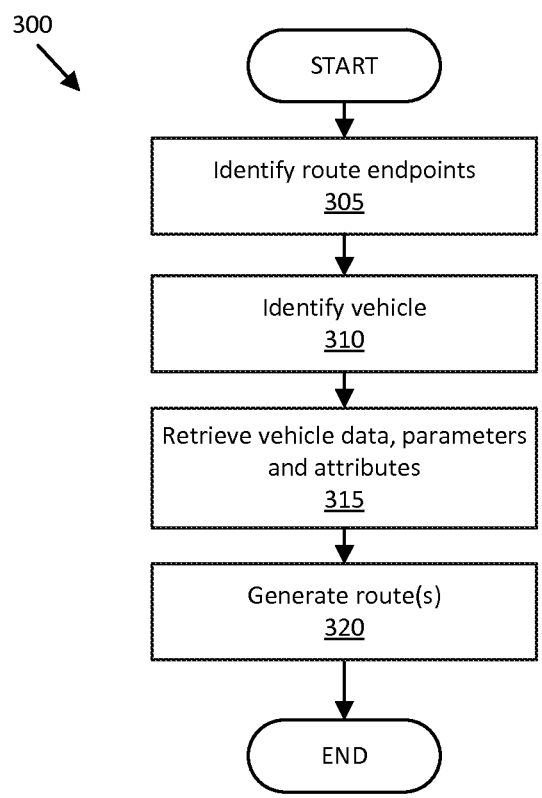
FIG. 3 is a diagram of an exemplary process for route generation.

FIG. 3 is a diagram of an exemplary process 300 for route generation. The process 300 begins in a block 305, in which a user requests a route, i.e., route start and end points are identified. For example, a user of a device 150, a vehicle 101 computer 105, etc., could specify a start point and an end point for a route. Further, where route generation is to be performed by a module 106 on the server 125, the device 150 or computer 105 could transmit route start and end points, e.g., according to geo-coordinates, street addresses, etc., to the server 125.

Next, in a block 310, a vehicle 101 and/or type of vehicle 101 that may be used for some or all of the requested route are identified. For example, a computer 105 could include as vehicle data 115 an identifier for a vehicle 101 and/or type of vehicle 101. As alluded to above, a vehicle 101 could be categorized according to various types, e.g., a powertrain type (e.g., BEV, HEV, IC engine only, two-wheel motorized vehicle, etc.), an occupancy type (e.g., single occupancy, high-occupancy, meaning two or more, three or more, etc. occupants, etc.). Alternatively or additionally, a computer 105 could store, or could obtain from one or more data collectors 110 vehicle data 115, as described above, such as a photograph or the like to obtain a VIN or the like that could be sent to the server 125 and used to determine a type of vehicle 101. Likewise, a device 150 could be used to take a photograph of a VIN for submission to the server 125. Yet further, user input could specify a vehicle 101 type, or even provide a vehicle identifier, e.g., a VIN, via a device 150 or vehicle 101 computer 105.

Next, in a block of 315, the module 106, e.g., being executed by one of the devices 105, 125, 150, retrieves, along with data identifying possible waypoints and segments between the specified start point and end point, vehicle data 115, parameters 116, and attributes 117 for use in generating a requested route. For example, vehicle data 115, as described above, may include information identifying a type of vehicle 101. Further, parameters 116 may specify types of waypoints and/or segments that may be included in a route and/or weights to be given to including such waypoints and/or segments in a route. Yet further, attributes 117, as described above, may pertain to identified possible waypoints and/or segments for a route.

Next, in a block 320, one or more possible routes between the specified start point and end point may be preliminarily generated by the module 106. Conventional algorithms may be used to generate the one or more preliminary routes, e.g., such as are known for determining and optimizing a route that will provide a shortest distance to travel, a least time to travel, a vehicle 101 or transportation mode to select etc. However, a conventionally generated route may not be optimal for a particular user. Therefore, the module 106 evaluates one or more preliminary routes according to data 115, parameters 116, and/or attributes 117.

For example, the module 106 may compare parameters 116 to attributes 117 to determine whether any waypoints and/or segments may not be included on a final route presented to the user. As mentioned above, a parameter 116 may specify waypoint and/or route segment attributes 117 that are a basis for excluding a waypoint from a route, e.g., a parameter 116 could specify that a route should not include bus travel.

Further, the module 106 may take vehicle 101 data 115 into account. For example, vehicle data 115 could be used to estimate an amount of fuel that a vehicle 101 consumes on a particular type of road, at a particular speed, etc. Further, vehicle 101 data 115 may specify that a vehicle 101 falls into an environmentally favored class, e.g., BEV, HEV, motor-scooter, etc. In this example, then, the module 106 could identify waypoints and/or route segments taking advantage of the vehicle 101 type or class. In one case, as mentioned above, the module 106 could identify parking or transit stations such as light rail stations available for a vehicle 101 class. Likewise, the module 106 could identify refueling stations for a vehicle 101, e.g., having providing electric recharging stations, having alternative bio-fuels or the like, etc. Moreover, a parameter 116 could specify a weight to be given to available parking for a vehicle 101 and/or a weight to be given to use of public transit over driving a private vehicle 101, etc. Yet further, a parameter 116 could specify a weight for a particular type of vehicle 101 based on characteristics of the type of vehicle 101, e.g., an electric vehicle may reduce costs or save travel time (e.g., because special lanes may be available for electric vehicles). Yet further, a parameter 116 could specify a weight to be given to a location and/or availability of a car-sharing service or the like to which a user subscribed.

Continuing the foregoing example, nodes and arcs of a graph such as the graph 200 of FIG. 2 could be used to represent waypoints and route segments, as discussed above. When a route is represented in a graph 200, data 115, parameters 116, and/or attributes 117 could be used to remove nodes and arcs from the graph 200, i.e., to eliminate waypoints and route segments from consideration for a route. Further, parameters 116 could specify weights for various attributes 117, such as availability of parking for a vehicle 101 type, parking costs, etc. A route from available waypoints and route segments (not otherwise eliminated) could then be determined according to an objective function or the like that maximized or minimized a value determined by taking into account various factors including attributes 117 as well as conventional factors for route selection, such as shortest distance traveled, least time to travel, etc. For example, an objective function could be minimized for a value that took into account route distance, travel time, vehicle types, transportation modes, etc., combined with weighted factors for availability of public transit and parking for a vehicle 101 at a public transit station, weather, or temperature, road conditions (e.g., on a hot day, a user may not want to bike or drive a batter-electric vehicle because of an effect of heat on a battery, etc.).

Once a route is determined in the block 320, it may be presented to a user, e.g., via a device 150, 105, etc., for use, approval or acceptance. For example, an HMI of a computer 105, a display of a device 150, etc., may include a graphical user interface (GUI or the like, for presenting a graphical and/or textual description of a proposed route, waypoints, routes segments, etc. Further, the module 106 could be configured to identify possible waypoints of interest, e.g., refueling stations, restaurants, etc., when presenting a route.

Following the block 320, the process 300 ends.

Variations on the process 300 are possible. For example, the block 310 could include identifying multiple vehicle 101 types. For instance, a user could have available a BEV car, an IC engine car, and a bicycle, and could specify each of these three possible vehicle 101 types. The block 315 could then include retrieving data 115, parameters 116, and attributes 117 for each of these three vehicle 101 types and different routes could be considered in the block 320 for each of the three vehicle 101 types. Further, different objective functions could result in selecting different routes using one of the three vehicle 101 types. For example, one objective function could minimize an economic cost, and select a route using a bicycle, walking, and/or public transit. Another objective function could seek to minimize a carbon footprint, and could select a similar route. However, yet another objective function could seek to minimize travel time, and could select a route using the BEV car or the IC engine car. If the objective function took into account other factors, such as minimizing a carbon footprint, e.g., pollution emissions, the BEV car could be selected over the IC engine car. Likewise, if the objective function took into account factors such as availability of parking and parking cost, special lanes available for a BEV vehicle, the recommended route could include use of the BEV vehicle to get to a transit station having such parking, and then use of public transit to get to a city center. Likewise, an objective function could take into account, in addition or as an alternative to a vehicle 101 type, a number of occupants in a vehicle 101, availability of car-sharing waypoints, and other factors.

Further, elements of the system 100, steps of the process 300, etc., are described herein with respect to a route including various modes of ground transportation. However, other types of transit, e.g., air travel, water travel, etc. could be included. For example, a route could include road travel to an airport, parking at an airport, air travel from a first city to a second city, and then use of public transit in the second city, possibly road travel in a rental car in the second city, etc. Likewise, a route proposed by the module 106 could specify a type of car, e.g., based on fuel economy and/or emissions data such as is available from one or more remote sources 160, e.g., the website of the U.S. Environmental Protection Agency.

Yet further, as noted above, parameters 116 may be personalized for a user, e.g., according to user input. For example, a user could specify that the user possesses a parking pass for a potential waypoint between a specified route start point and end point, is a member of a car-sharing service and/or bicycle-sharing service that could be available at a route waypoint, that the user possesses transit passes providing economical (e.g., unlimited in a period of time, discounted, etc.) public transit passes, etc. Likewise, such information about a user could be stored, e.g., in a device 150, in the data store 130, etc., in conjunction with a user identifier, and retrieved by the module 106 for use in route generation.

In any event, the module 106 could then generate or modify parameters 116 tailored to such input and/or stored user information. For example, a parameter 116 relating to a weight to be given to use of a public transit system could be modified to have greater weight based on information that a user possesses an unlimited transit pass. Likewise, the module 106 could ignore waypoints associated with car-sharing and/or bicycle-sharing services unless user information specified that a user was a member of a service associated with a waypoint. Further for example, vehicle 101 data 115 could be used as user data, e.g., a user's average driving speed, average bicycling speed, etc., could be collected and used to estimate travel times. Such data 115 could be collected by a vehicle 105 computer and/or user device 150, and/or input or uploaded to the server 125 for storage in the data store 130, etc.

CONCLUSION

Computing devices such as those discussed herein generally each include a processor and a memory, the memory including one or more forms of computer-readable media, and storing instructions executable by the processor for performing various operations, including as disclosed herein. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a computer in a vehicle, the computer comprising a processor and a memory, wherein the computer is configured to:
   receive input specifying a route start point and a route end point;
   retrieve data relating to a vehicle type for possible use on the route;
   retrieve data including at least one attribute of each of one or more possible route waypoints, the at least one attribute relating to at least parking availability for the vehicle type; and
   determine a route between the start point and the end point at least in part by applying a route parameter to the attribute; wherein applying the route parameter includes excluding at least one waypoint from consideration for the route.

2. The system of claim 1, the attribute further relating to a parking cost for the vehicle type.

3. The system of claim 1, wherein the computer is further configured to retrieve data identifying a user planning to traverse the route, and to determine the route parameter at least in part according to the user's identity or a number of vehicle occupants.

4. The system of claim 1, wherein the at least one attribute identifies at least one of a fueling station, a public transit station, a car-sharing station, a pedestrian waypoint, and a high-occupancy roadway.

5. The system of claim 1, wherein the at least one attribute includes a parking cost for the vehicle type at a specific waypoint.

6. The system of claim 1, wherein the at least one attribute includes at least one of a geo-coordinate, weather data, availability of a special lane based on a vehicle type, a number of vehicle occupants, presence of one or more charging stations, a road condition, a location of a vehicle-sharing service, vehicle type availability, and availability of one or more biking lanes.

7. The system of claim 1, wherein the vehicle type is one of a motor-cycle, a motor-scooter, a bicycle, a number of occupants in a vehicle, and an automobile.

8. The system of claim 1, wherein the computer is included in a vehicle.

9. A method, comprising:
  receiving input specifying a route start point and a route end point;
  retrieving data relating to a vehicle type for possible use on the route;
  retrieving data including at least one attribute of each of one or more possible route waypoints, the at least one attribute relating to at least parking availability for the vehicle type; and
  determining a route between the start point and the end point at least in part by applying a route parameter to the attribute; wherein applying the route parameter includes excluding at least one waypoint from consideration for the route.

10. The method of claim 9, the attribute further relating to a parking cost for the vehicle type.

11. The method of claim 9, further comprising retrieving data identifying a user planning to traverse the route, and to determine the route parameter at least in part according to the user's identity or a number of vehicle occupants.

12. The method of claim 9, wherein the at least one attribute identifies at least one of a fueling station, a public transit station, a car-sharing station, a pedestrian waypoint, and a high-occupancy roadway.

13. The method of claim 9, wherein the at least one attribute includes a parking cost for the vehicle type at a specific waypoint.

14. The method of claim 9, wherein the at least one attribute includes at least one of a geo-coordinate, weather data, availability of a special lane based on a vehicle type, a number of vehicle occupants, presence of one or more charging stations, a road condition, a location of a vehicle-sharing service, vehicle type availability, and availability of one or more biking lanes.

15. The method of claim 9, wherein the vehicle type is one of a motor-cycle, a motor-scooter, a bicycle, a number of occupants in a vehicle, and an automobile.

16. A non-transitory computer-readable medium having tangibly embodied thereon instructions executable by a computer processor, the instructions including instructions to:
  receive input specifying a route start point and a route end point;
  retrieve data relating to a vehicle type for possible use on the route;
  retrieve data including at least one attribute of each of one or more possible route waypoints, the at least one attribute relating to at least parking availability for the vehicle type; and
  determine a route between the start point and the end point at least in part by applying a route parameter to the attribute; wherein applying the route parameter includes excluding at least one waypoint from consideration for the route.

17. The medium of claim 16, the attribute further relating to a parking cost for the vehicle type.

18. The medium of claim 16, wherein the at least one attribute includes a parking cost for the vehicle type at a specific waypoint.

* * * * *